(12) United States Patent
Kobayashi

(10) Patent No.: US 6,690,991 B1
(45) Date of Patent: Feb. 10, 2004

(54) MACHINE CONTROL GAGE SYSTEM PERFORMING ROUNDNESS MEASURING FUNCTION

(75) Inventor: Hiroyuki Kobayashi, Mitaka (JP)

(73) Assignee: Tokyo Seimitsu Co., Ltd., Miyaka (JP)

( * ) Notice: Subject to any disclaimer, the term of this patent is extended or adjusted under 35 U.S.C. 154(b) by 0 days.

(21) Appl. No.: 09/541,983

(22) Filed: Apr. 3, 2000

(30) Foreign Application Priority Data

| Apr. 6, 1999 | (JP) | 11-098592 |
| May 27, 1999 | (JP) | 11-148711 |
| Mar. 6, 2000 | (JP) | 2000-61007 |

(51) Int. Cl.$^7$ ............................................. G06F 19/00
(52) U.S. Cl. ....................... 700/195; 700/164; 700/175; 702/157; 33/550; 33/555.1; 451/5
(58) Field of Search ................................ 700/187, 164, 700/172, 175, 176, 193, 194, 195, 163; 73/104; 33/550–555.1, 556, 505, 503, 504; 702/157, 167; 451/21, 8, 9, 5; 324/103 P

(56) References Cited

U.S. PATENT DOCUMENTS

| 3,615,143 A | * | 10/1971 | Barr et al. ..................... 33/505 |
| 3,768,010 A | * | 10/1973 | Pozzetti ................... 324/103 P |
| 3,775,910 A | | 12/1973 | Kubo ....................... 51/165.77 |
| 3,846,916 A | | 11/1974 | Moriya et al. ............. 33/174 Q |
| 3,863,400 A | | 2/1975 | Rossi ....................... 51/165.77 |
| 4,903,413 A | * | 2/1990 | Bellwood ..................... 33/551 |
| 4,964,071 A | * | 10/1990 | Grosvenor ................... 702/157 |
| 5,103,596 A | | 4/1992 | Fujii et al. ............... 51/165.76 |
| 5,337,485 A | * | 8/1994 | Chien .......................... 33/550 |
| 5,741,172 A | * | 4/1998 | Trionfetti et al. ............. 451/21 |
| 6,098,452 A | * | 8/2000 | Enomoto ..................... 73/104 |

FOREIGN PATENT DOCUMENTS

EP 0 742 078 A1 11/1996

* cited by examiner

Primary Examiner—Leo Picard
Assistant Examiner—Steven R. Garland
(74) Attorney, Agent, or Firm—Oliff & Berridge PLC

(57) ABSTRACT

A machine control gage system has a control unit, which analyzes roundness of a workpiece. The control unit controls a grinding machine controller in such a manner as to machine the workpiece to a desired size according to data measured by a measuring head. The control unit analyzes roundness of the workpiece according to the data measured by the measuring head and displays the roundness on a touch panel.

20 Claims, 18 Drawing Sheets

FIG. 7 (a)

WORK

20D

FFT ANALYSIS MEASUREMENT 0001  NO FILTER  UNIT: μm
RESULTS      ITEM

| No | DETERMINATION RANGE (U/R) | MUXIMUM | MUXIMUM U/R | MMAXIMUM OSCILLATION | DETERMINATION |
|----|---------------------------|---------|-------------|----------------------|---------------|
| 1  | 3- 8                      | 5.0     | 5           | 8.0                  | NG            |
| 2  | 15- 25                    | 3.0     | 20          | 2.0                  | OK            |
| 3  | 0- 0                      | 0.0     |             |                      |               |
| 4  | 0- 0                      | 0.0     |             |                      |               |
| 5  | 0- 0                      | 0.0     |             |                      |               |
| 6  | 0- 0                      | 0.0     |             |                      |               |
| 7  | 0- 0                      | 0.0     |             |                      |               |
| 8  | 0- 0                      | 0.0     |             |                      |               |
| 9  | 0- 0                      | 0.0     |             |                      |               |
| 10 | 0- 0                      | 0.0     |             |                      |               |

▼  BACK

FIG. 7 (b)

WORK

FFT ANALYSIS RESULTS    NG   NO FILTER  P-P= 9.5  UNIT: μm

OSCILLATION
10.0

5   10   15   20   25   30   35   40   45   50
UNDULATIONS PER REVOLUTION

DISPLAY    SET    BACK

F I G. 1 0
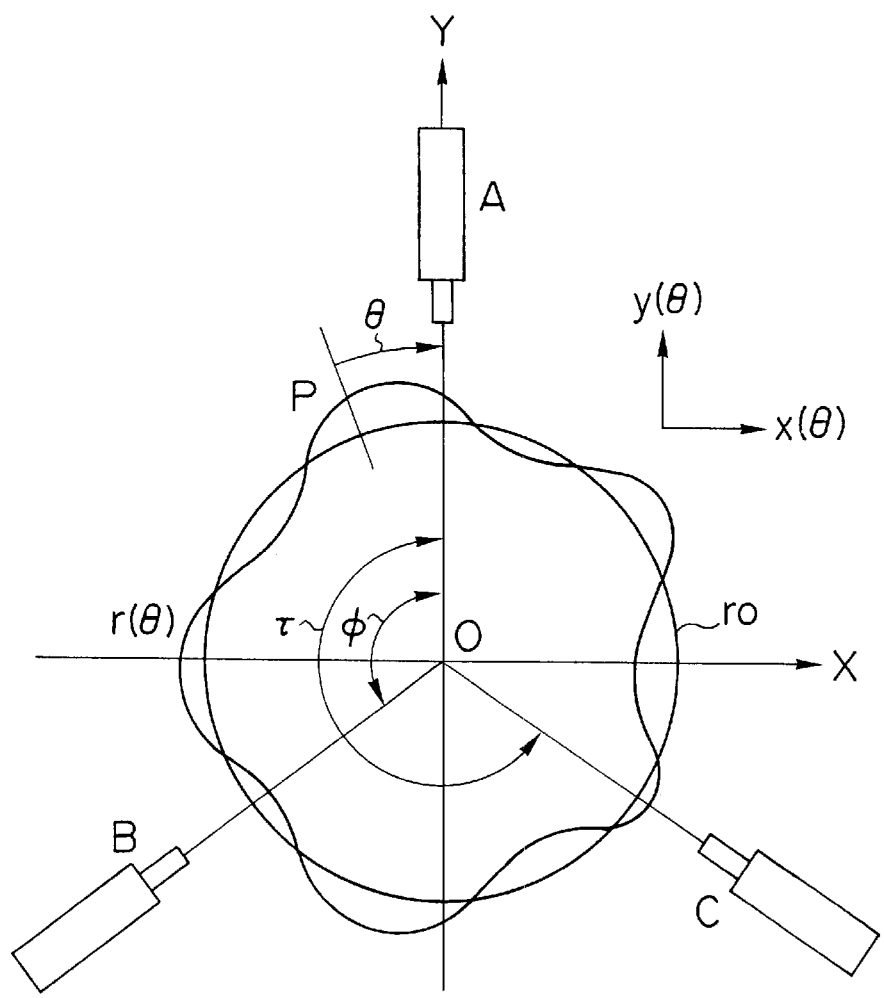

| No | DETERMINATION RANGE (U/R) | MUXIMUM | MUXIMUM U/R | MMAXIMUM OSCILLATION | DETERMINATION |
|---|---|---|---|---|---|
| 1 | 3- 8 | 5.0 | 5 | 8.0 | NG |
| 2 | 15- 25 | 3.0 | 20 | 2.0 | OK |
| 3 | 0- 0 | 0.0 | | | |
| 4 | 0- 0 | 0.0 | | | |
| 5 | 0- 0 | 0.0 | | | |
| 6 | 0- 0 | 0.0 | | | |
| 7 | 0- 0 | 0.0 | | | |
| 8 | 0- 0 | 0.0 | | | |
| 9 | 0- 0 | 0.0 | | | |
| 10 | 0- 0 | 0.0 | | | |

WORK — 120D
FFT ANALYSIS MEASUREMENT RESULTS ITEM 0001 NO FILTER UNIT: μm

BACK

WORK
FFT ANALYSIS RESULTS  NG  NO FILTER  P-P= 9.5  UNIT: μm
OSCILLATION
UNDULATIONS PER REVOLUTION

DISPLAY   SET   BACK

MACHINE CONTROL GAGE SYSTEM PERFORMING ROUNDNESS MEASURING FUNCTION

BACKGROUND OF THE INVENTION

1. Field of the Invention

The present invention relates generally to a machine control gage system, and more particularly to a machine control gage system that performs a roundness measuring function of measuring roundness of a workpiece.

2. Description of Related Art

A machine control gage system automatically measures the size of a workpiece, and it includes, for example, an automatic sizing device and an automatic inspecting device.

The automatic sizing device measures the size of a workpiece during machining to control a machining device in realtime in a production line, etc. For example, in a cylindrical grinding machine, when the size of the workpiece measured during the machining reaches respective preset sizes, the machine control gage system commands the grinding apparatus to change the grinding from rough grinding to fine grinding and from the fine grinding to spark-out grinding, and to move a wheel spindle stock backward.

When the roundness of the workpiece machined by the machining device with the conventional machine control gage system is measured, the workpiece must be unloaded from the machining device on completion of the machining and transferred to a roundness measuring machine that measures the roundness of the workpiece.

However, a lot of time is needed in order to measure the roundness of the workpiece with the roundness measuring machine. For this reason, the roundness of all the workpieces machined in the production line or the like can not be measured.

On the other hand, the automatic inspecting device measures the size of the workpiece after a machining device machines the workpiece in the production line or the like and determines whether the workpiece is defective or not in accordance with the measurement data or feeds-back the measurement data to the machining device to correct the machining conditions. For example, the automatic inspecting device measures the size of the workpiece machined with a lathe and determines whether the workpiece is defective or not by comparing the measured size and the tolerance. The automatic inspecting device removes the defective workpieces and feeds-back the measurement data to the lathe to correct the position of the edge of the tool and the position of the workpiece.

When the roundness of the workpiece machined by the machining device such as the lathe with the conventional machine control gage system is measured, the workpiece must be unloaded from the machining device on completion of the machining and transferred to a roundness measuring machine that measures the roundness of the workpiece.

However, it takes a long time to measure the roundness of the workpiece with the roundness measuring machine. For this reason, the roundness of all the workpieces machined in the production line or the like can not be measured.

SUMMARY OF THE INVENTION

The present invention has been developed in view of the above-described circumstances, and has as its object the provision of a machine control gage system that is capable of measuring roundness of a workpiece.

To achieve the above-mentioned object, the present invention is directed to a machine control gage system which measures a size of a workpiece while a machining device machines the workpiece and commands the machining device to stop machining when the measured size of the workpiece reaches a preset size, the machine control gage system comprising: a radius data measuring device which measures radius data corresponding to rotational angles of the workpiece; a storing device which stores the radius data measured by the radius data measuring device; and a roundness calculating device which analyzes roundness of the workpiece in accordance with the radius data stored in the storing device to calculate the roundness of the workpiece, wherein the machine control gage system performs a roundness measuring function.

According to the present invention, the machine control gage system such as an automatic sizing device, used in the process line, performs a roundness measuring function of measuring roundness of the workpiece. Therefore, the roundness can be measured in the process line without detaching the workpiece from the machining device.

To achieve the above-mentioned object, the present invention is directed to a machine control gage system which measures a size of a workpiece rotated by a rotating-driving device after a machining device machines the workpiece and performs one of determination whether the workpiece is defective or not in accordance with measurement data and feed-back of the measurement data to the machining device, the machine control gage system comprising: a radius data measuring device which measures radius data corresponding to rotational angles of the workpiece; a storing device which stores the radius data measured by the radius data measuring device; and a roundness calculating device which analyzes roundness of the workpiece in accordance with the radius data stored in the storing device to calculate the roundness of the workpiece, wherein the machine control gage system performs a roundness measuring function.

According to the present invention, the machine control gage system for measuring the size of the workpiece that has been machined with the machining device performs a roundness measuring function of measuring the roundness of the workpiece. Accordingly, there is no necessity to measure the roundness of the workpiece with a special roundness measuring machine. Therefore, the roundness of all the workpieces machined in the production line or the like can be measured.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIGS. 7(a) and 7(b) are views showing pictures of the touch panel displaying a determination results whether the roundness is good or bad according to the results of the FFT analysis;

FIG. 10 is a view showing the measurement principle of the machine control gage system in FIG. 8;

DETAILED DESCRIPTION OF THE PREFERRED EMBODIMENT

This invention will be described in further detail by way of example with reference to the accompanying drawings.

Figure 1:
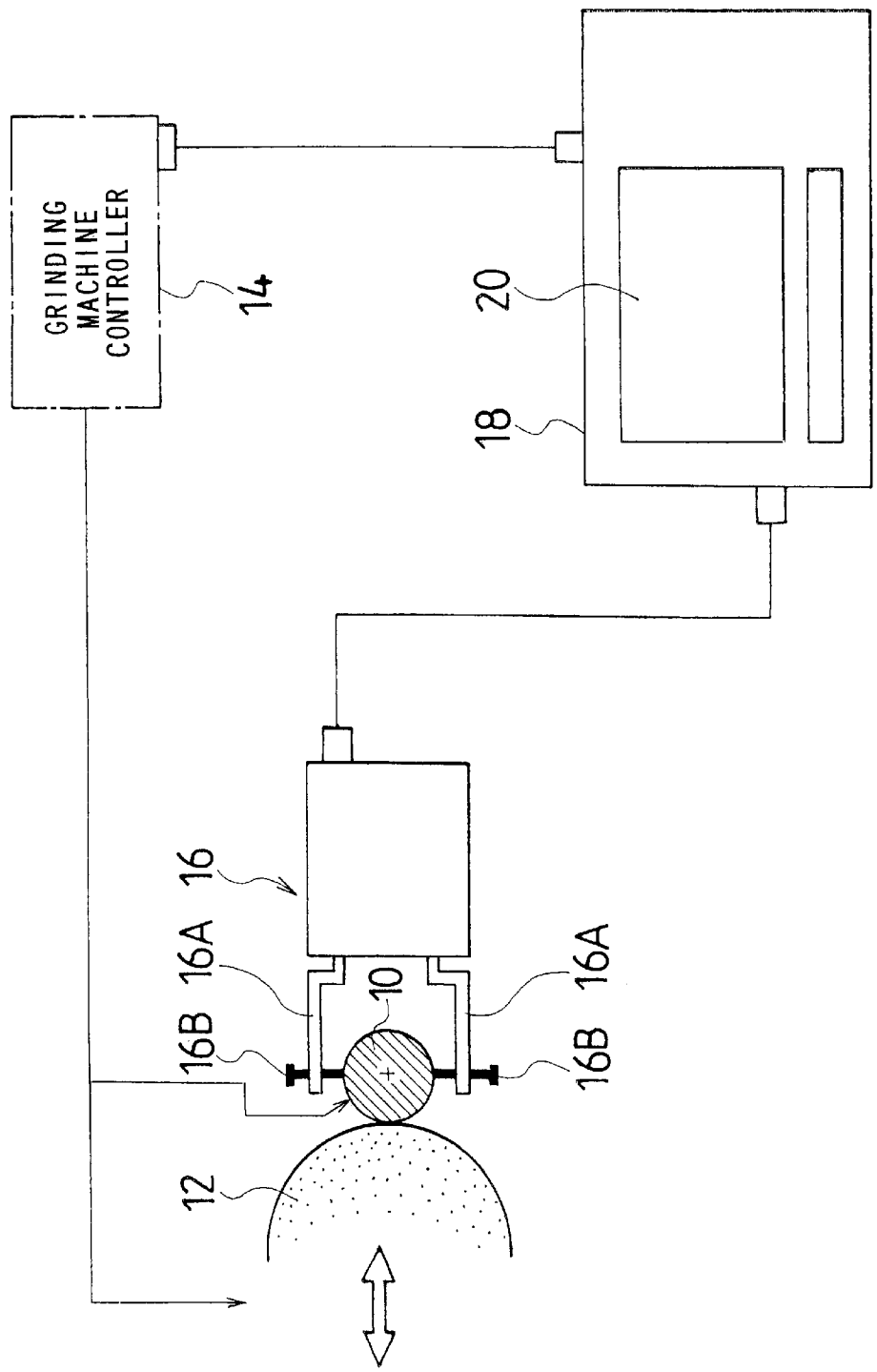
FIG. 1 is a view illustrating the entire structure of a machine control gage system according to a first embodiment of the present invention.

FIG. 1 shows the entire structure of a machine control gage system according to a first embodiment of the present invention, which is an automatic sizing device applied to a cylindrical grinding machine.

The cylindrical grinding machine grinds the periphery of a workpiece 10 by pressing a rotating grindstone 12 against the rotating workpiece 10. The rotating speed of the workpiece 10 is controlled by a grinding machine controller 14, and the rotating speed and the movement with respect to the workpiece 10 of the grindstone 12 are controlled by the grinding machine controller 14.

Figure 2:
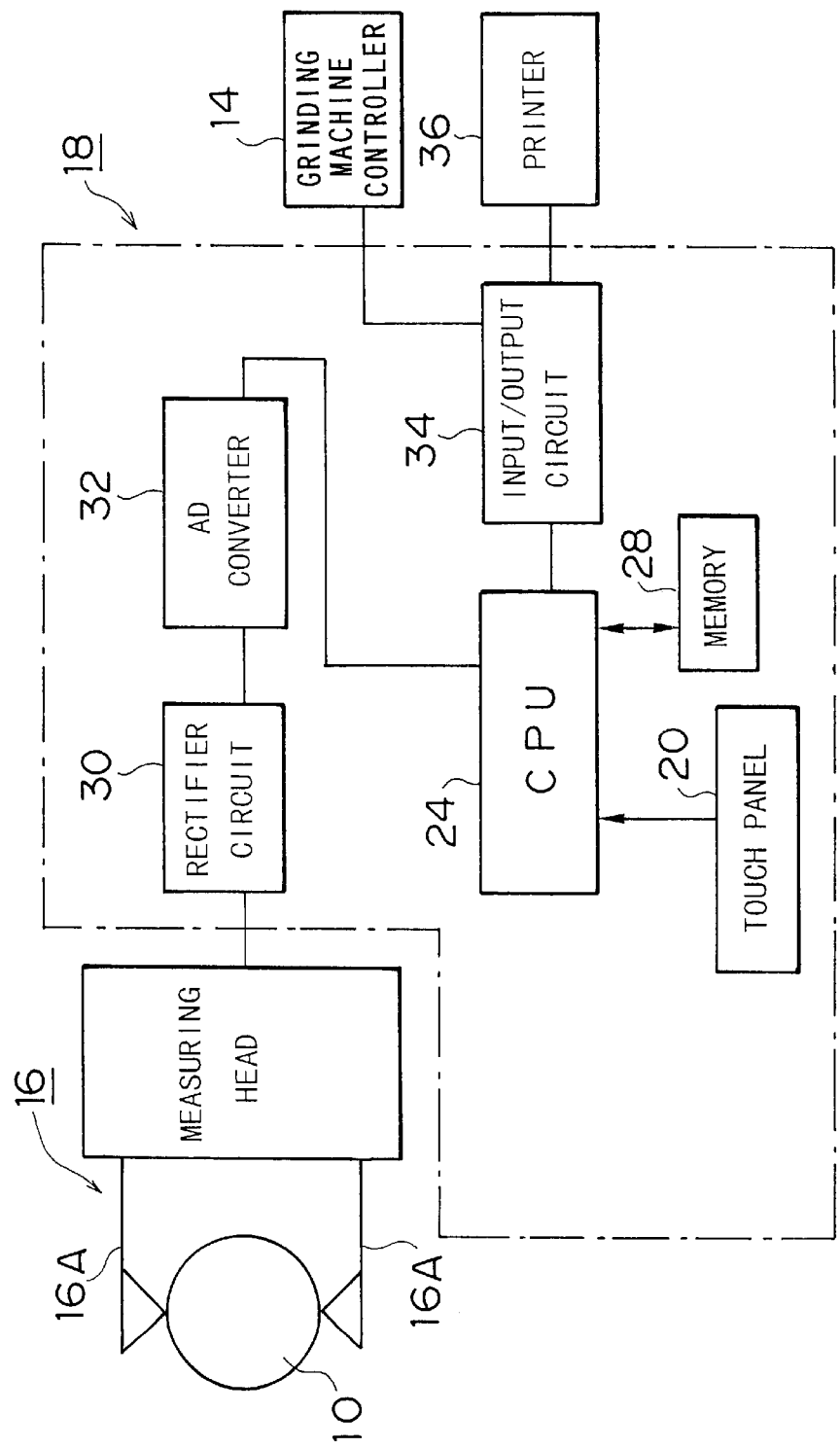
FIG. 2 is a block diagram showing the structure of the machine control gage system in FIG. 1.

As shown in FIGS. 1 and 2, the machine control gage system comprises a measuring head 16, which is applied to the workpiece 10, and a control unit 18, which analyzes the measurement data outputted from the measuring head 16.

As shown in FIG. 1, the measuring head 16 has two fingers 16A, and contacts 16B are attached to the ends of the fingers 16A. The fingers 16A are capable of swinging about fulcrums within the body of the measuring head 16 so that the tips of the contacts 16B come into contact with the outer peripheral surface of the workpiece 10. As the size of the workpiece 10 changes during the grinding, the fingers 16A swing according to the change of the size of the workpiece 10. The measuring head 16 determines the displacement of the fingers 16A as an electric signal with a differential transformer provided within the body thereof and outputs the electric signal to the control unit 18.

The control unit 18 comprises a touch panel 20, a CPU 24, a memory 28, a rectifier circuit 30, an A/D converter 32 and an input/output circuit 34.

The electric signal representing the displacement of the fingers 16A outputted from the measuring head 16 is rectified by the rectifier circuit 30 and then converted into a digital signal by the A/D converter 32. The CPU 24 calculates the size of the workpiece 10 according to the measurement data converted into the digital signal.

The CPU 24 determines whether the calculated size of the workpiece 10 has reached a predetermined size. When the size of the workpiece 10 reaches the predetermined size, the CPU 24 outputs a signal to the grinding machine controller 14 through the input/output circuit (an interface to the exterior) 34. The grinding machine controller 14 controls the workpiece 10 and the grindstone 12 in accordance with the signal.

Figure 3:
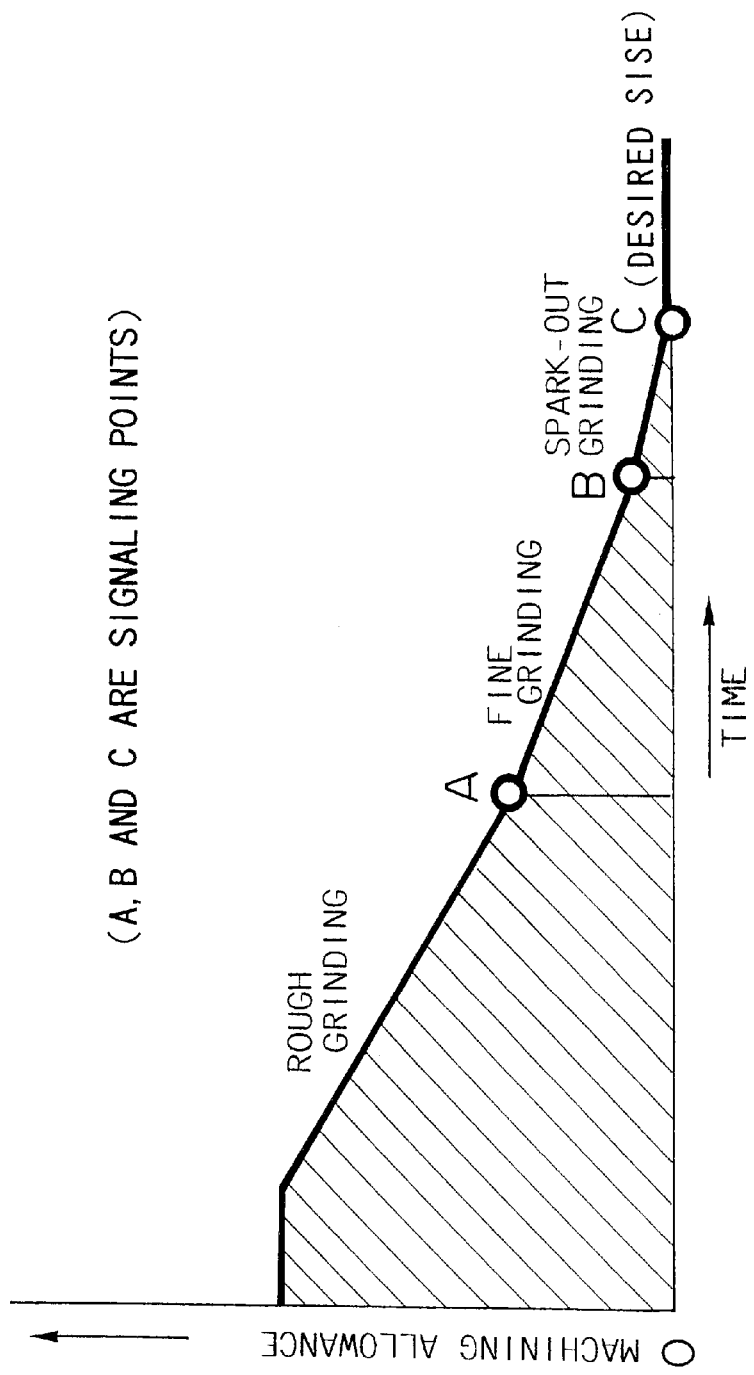
FIG. 3 is a view showing the working procedure of the machine control gage system in FIG. 1.

As shown in FIG. 3, when the size of the workpiece 10 reaches a predetermined first machining allowance (A in FIG. 3), the CPU 24 outputs a first signal to the grinding machine controller 14 through the input/output circuit 34. Upon reception of the first signal, the grinding machine controller 14 switches the rough grinding to the fine grinding. When the size of the workpiece 10 reaches a predetermined second machining allowance (B in FIG. 3), the CPU 24 outputs a second signal (a spark-out signal) to the grinding machine controller 14 through the input/output circuit 34. Upon reception of the spark-out signal, the grinding machine controller 14 switches the fine grinding to the spark-out grinding. When the size of the workpiece 10 reaches a predetermined third machining allowance (C in FIG. 3), the CPU 24 outputs a third signal (a desired-size signal) to the grinding machine controller 14 through the input/output circuit 34. Upon reception of the desired-size signal, the grinding machine controller 14 moves back the grindstone 12 from the workpiece 12 to finish the machining.

The first, second and third machining allowances are stored in the memory 28, and the operator inputs them with the touch panel 20 of the control part 18 before the start of the machining.

Figure 5:
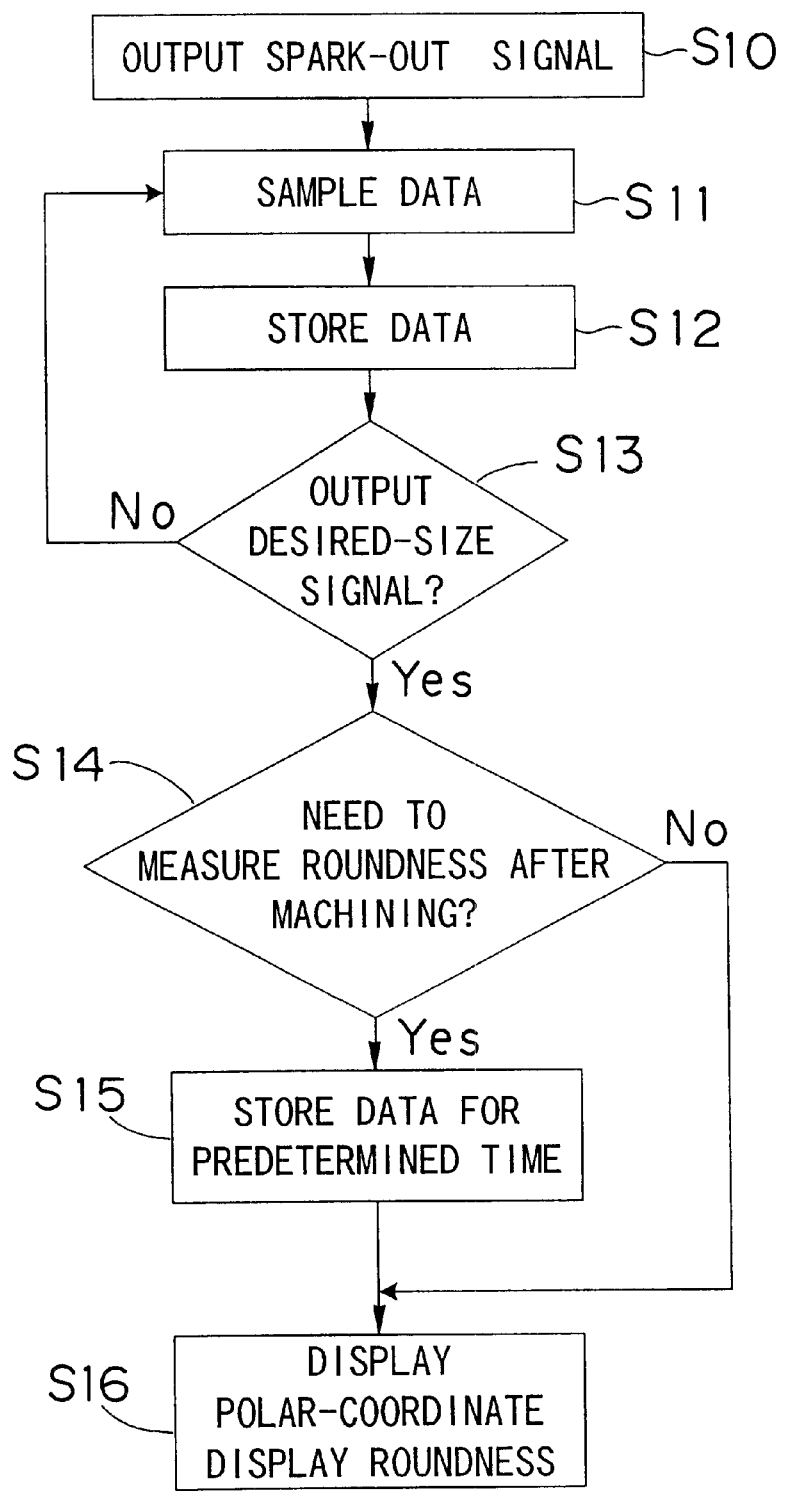
FIG. 5 is a flow chart showing the procedure for a control unit to calculate the roundness before or after the machining.

As stated above, the machine control gage system of this embodiment performs the automatic sizing function. Also, the machine control gage system performs a roundness measuring function of measuring roundness of the workpiece 10. The roundness is measured according to the flow chart in FIG. 5 as follows.

When the control unit 18 outputs the spark-out signal to the grinding machine controller 14 (S10, the control unit 18 starts sampling measurement data corresponding to rotational angles of the workpiece 10 from the measuring head 16 (S11). The sampled data is stored in the memory 28 every predetermined time (S12).

As described above, when the size of the workpiece 10 reaches the predetermined third machining allowance (C in FIG. 3), the control unit 18 outputs the desired-size signal to the grinding machine controller 14 (S13).

Then, the control unit 18 determines whether to measure the roundness just after the machining (S14). If the roundness has to be measured, the control unit 18 samples the measurement data just after the machining for a predetermined time and stores the sampled data in the memory 28 (S15).

Figure 4:
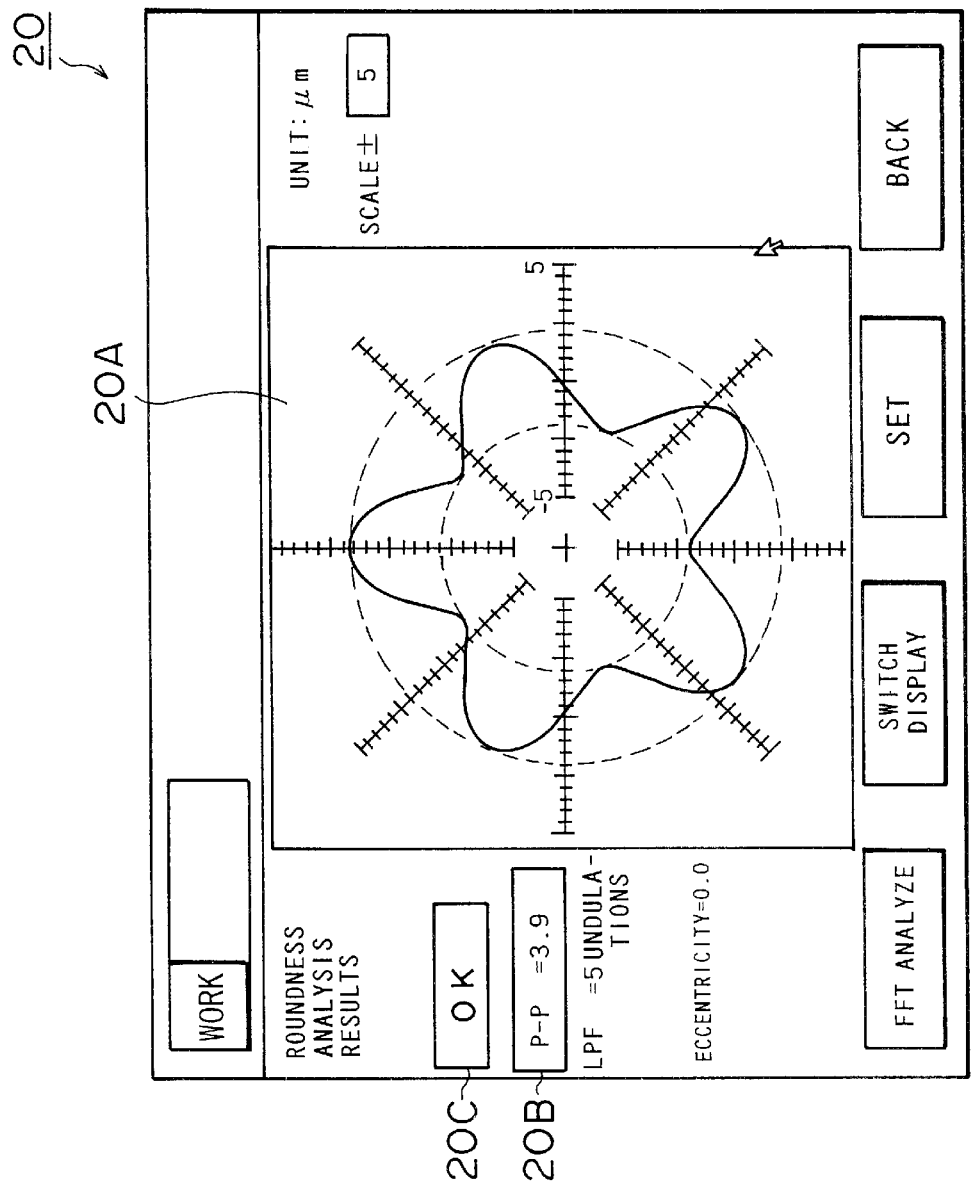
FIG. 4 is a view showing a picture of a touch panel whose polar-coordinate displaying part displays roundness.

If the roundness does not have to be measured just after the machining, the control unit 18 executes a roundness analyzing processing on the basis of sampled data just before the machining. The measurement data for one rotation, sampled just before the desired-size signal is outputted, is filtered, and radiuses corresponding to the rotational angles of the workpiece 10 are calculated according to the filtered data. The calculated results are displayed on a polar-coordinate displaying part 20A of the touch panel 20 as shown in FIG. 4. At the same time, the roundness, which is the difference between the maximum and the minimum of the radiuses, is calculated, and the calculated roundness is displayed on a peak to peak (P—P) value displaying part 20B of the touch panel 20 (S16).

To measure the roundness just after the machining, the control unit 18 executes the roundness analyzing processing on the basis of the measurement data for one rotation sampled just after the machining. The measurement data sampled just after the machining is filtered, and radiuses corresponding to the rotational angles of the workpiece 10 are calculated according to the filtered data. The calculated results are displayed on the polar-coordinate displaying part 20A of the touch panel 20 as shown in FIG. 4. At the same time, the difference between the maximum and the minimum of the radiuses is calculated as the roundness, and the calculated roundness is displayed on the P—P value displaying part 20B of the touch panel 20 (S16).

As described above, according to the machine control gage system of this embodiment, the roundness can be measured just before or just after the machining. By measuring the roundness just before the machining, the workpiece 10 can be processed more efficiently regardless of the cycle.

The operator decides whether to measure the roundness just before or just after the machining with the touch panel 20 or the like. The operator may decide that before the start of the machining of the workpiece 10, during or after the machining.

As described above, the machine control gage system of this embodiment can measure the roundness of the workpiece 10 in the production line and determine whether the roundness of the workpiece 10 is good or bad according to the measurement data. The control unit 18 compares the roundness calculated by the above-described roundness analyzing processing with a preset maximum of the roundness. If the calculated roundness is not more than the maximum, "OK" is displayed on a determining part 20C of the touch panel 20 as shown in FIG. 4. If the calculated roundness is more than the maximum, "NG" is displayed on the determining part 20C.

As described above, the machine control gage system of this embodiment can determine whether the roundness of the workpiece 10 is good or bad in the production line. The determined result may be outputted to an external apparatus as need arises, and thus defective workpieces 10 can be removed from the production line.

The operator sets the maximum of the roundness with the touch panel 20 or the like. The operator may set that before the start of the machining of the workpiece 10, during or after the machining.

Figure 6:
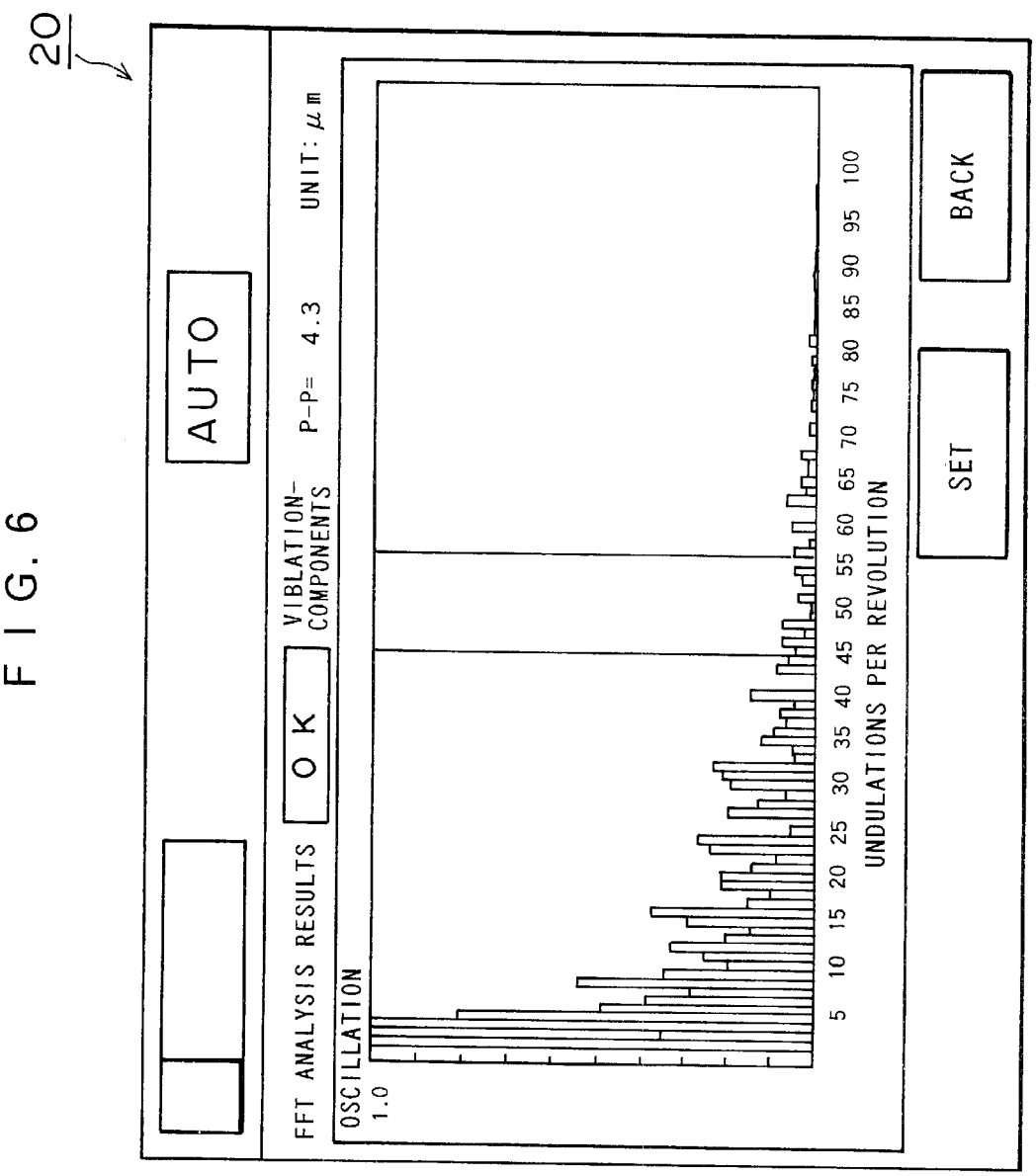
FIG. 6 is a view showing a picture of the touch panel displaying a power spectrum of the results of an FFT analysis.

The filtered radius data of the workpiece 10 is fast Fourier transformed and analyzed into frequency components (FFT analysis), and the power spectrum acquired by the FFT analysis is displayed on the touch panel 20 as shown in FIG. 6. Accordingly, the cause of the defectiveness of the roundness can be found by analyzing the data into the components in the production line. Generally, oscillations of low-frequency components such as ellipses and triangles are so large that oscillations of 20 and 30 undulations per revolution, which are considered vibrations, are ineffective. However, by the FFT analysis, the oscillation of each component is specific and the components that are considered the vibrations can be analyzed.

The control unit 18 may compare the oscillations of specific frequencies acquired by the FFT analysis with the preset maximums of the oscillations of the frequencies to automatically determine whether the roundness of the workpiece 10 is good or bad and the grinding conditions are good or bad. Then, as shown in FIGS. 7(*a*) and 7(*b*), if the oscillation of the specific frequency acquired by the FFT analysis is not more than the preset maximum of the oscillation of the frequency, "OK" is displayed on an FFT analysis determining part 20D of the touch panel 20. If the oscillation of the specific frequency acquired by the FFT analysis is more than the preset maximum of the oscillation of the frequency, "NG" is displayed on the FFT analysis determining part 20D.

In the example shown in FIGS. 7(*a*) and 7(*b*), the maximum of the oscillations of 3–8 undulations per revolution (frequency) is set at 5 μm, and the maximum of the oscillations of 15–25 undulations per revolution is set at 3 μm. The measured maximum of the oscillations of 3–8 undulations per revolution is 8.0 μm, and thus "NG" is displayed on the FFT analysis determining part 20D. The measured maximum of the oscillations of 15–25 undulations per revolution is 2.0 μm, and thus "OK" is displayed on the FFT analysis determining part 20D.

As described above, the machine control gage system can determine whether the roundness of the workpiece 10 is good or bad and the grinding conditions are good or bad in the production line. The determined result may be outputted to an external apparatus as need arises, and thus defective workpieces 10 can be removed from the production line.

The operator sets the maximums of the oscillations with the touch panel 20 or the like. The operator may set them before the start of the machining of the workpiece 10, during or after the machining.

In this embodiment, a frequency analyzing device analyzes the radius data by means of FFT, but it may use other analyzing methods.

Figure 8:
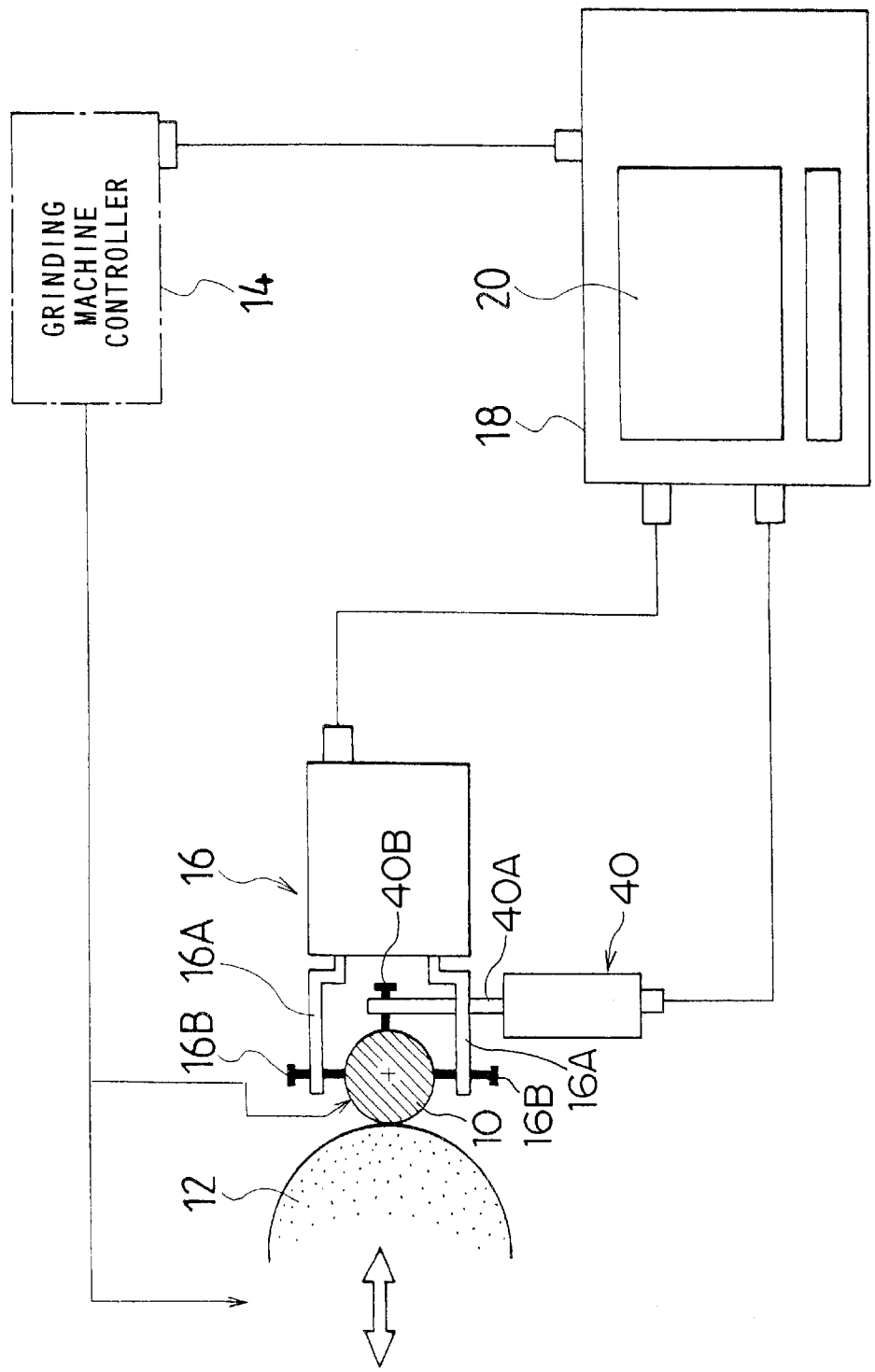
FIG. 8 is a view illustrating the entire structure of a machine control gage system according to a second embodiment of the present invention.

FIG. 8 shows the entire structure of a machine control gage system according to a second embodiment of the present invention, and members the same as or similar to members in the machine control gage system according to the first embodiment are denoted by the same numerals and they will not be explained.

The machine control gage system according to the second embodiment is different from the machine control gage system according to the first embodiment in that it has a measuring head 40. The measuring head 40 has a finger 40A, which is capable of swinging about a fulcrum within the body of the measuring head 40, and a contact 40B is attached to the end of the finger 40A. The tip of the contact 40B comes into contact with the outer peripheral surface of the workpiece 10. As the size of the workpiece 10 changes during the grinding, the finger 40A swings according to the change of the size of the workpiece 10. The measuring head 40 determines the displacement of the finger 40A as an electric signal with a differential transformer within the body thereof and outputs the electric signal to the control unit 18.

Figure 9:
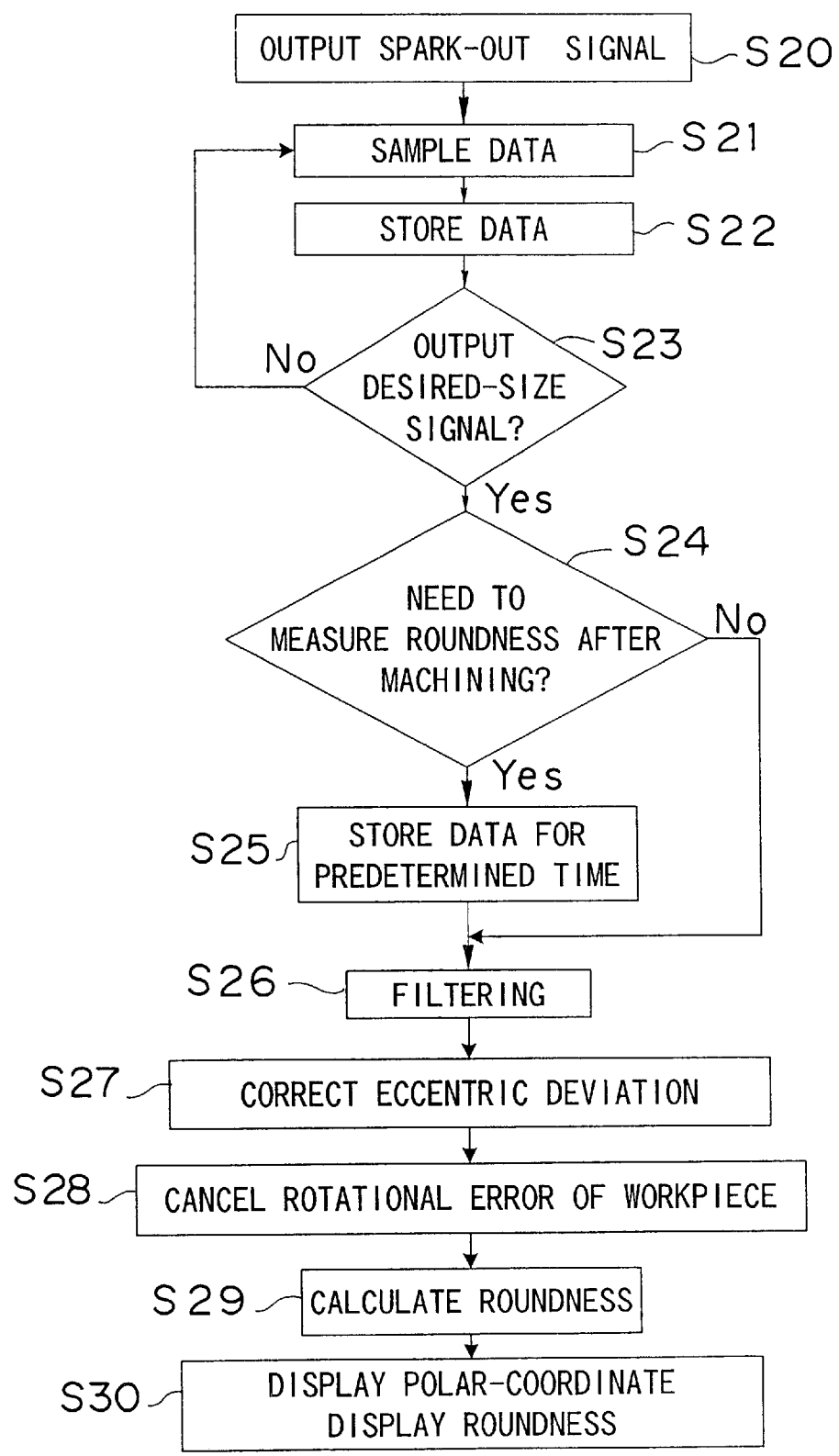
FIG. 9 is a flow chart showing the procedure for a control unit of the machine control gage system in FIG. 8.

As shown in FIG. 9, when the control unit 18 outputs the spark-out signal to the grinding machine controller 14 (S20), the control unit 18 starts sampling the measurement data corresponding to the rotational angles of the workpiece 10 from the measuring head 16 and the measuring head 40 (S21). The sampled data is stored in the memory 28 every predetermined time (S22).

As described above, when the size of the workpiece 10 reaches the predetermined third machining allowance, the control unit 18 outputs the desired-size signal to the grinding machine controller 14 (S23).

Then, the control unit 18 determines whether to measure the roundness just after the machining (S24). If the roundness has to be measured, the control unit 18 samples the measurement data just after the machining for the predetermined time and stores the sampled data in the memory 28 (S25).

If the roundness does not have to be measured just after the machining, the control unit 18 executes the following processing on the basis of sampled data just before the machining, that is the measurement data for one rotation sampled just before the desired-size signal is outputted.

The data stored in the memory 28 or the sampled data just before the machining is filtered (S26). In the filtering, for example, the user sets a cutoff value or cutoff values and noise components of short waves, bands other than the band required for the analysis, and so on are cut off. After the filtering, the control unit 18 finds the axis of the workpiece 10 according to the measurement data measured with the measuring head 16 and corrects the eccentric deviation of the measurement data (S27).

Then, the rotational error of the workpiece 10 is canceled in the three-point method according to samples of the measurement data measured with the measuring head 16 and the measuring head 40 (S28). The rotational error of the workpiece 10 is canceled in the three-point method that will be explained later. The rotational error of the axis of the workpiece 10 due to error motions of the workpiece 10 is thereby canceled.

The control unit 18 finds radiuses of an inscribed circle and a circumscribed circle that are concentric with the workpiece 10 and calculates the roundness, which is the difference in radius between the inscribed circle and the circumscribed circle (S29). The calculated radiuses corresponding to the rotational angles are displayed on the polar-coordinate displaying part 20A of the touch panel 20. At the same time, the calculated roundness is displayed on the P—P value displaying part 20B of the touch panel 20 (S30).

A description will now be given of the measurement principle of the three-point method for canceling the rotational error of the workpiece 10.

As shown in FIG. 10, three measuring heads A, B and C are arranged around a workpiece, and the angles formed between the measuring heads A and B and between the measuring heads B and C are $\phi$ and $\tau$, respectively. The intersection point of the axes of the three measuring heads A, B and C is O, and the intersection point O is adjacent to the rotation center of the workpiece. A rectangular coordinate system XY is set in such a manner that the intersection point O is the origin and the axis of the measuring head A is the Y-axis. An angle $\theta$ is set clockwise from a point P on the circle, and the error in the radius direction with an average radius $r_0$ being the reference is $r(\theta)$. When the point P is rotated counterclockwise by the angle $\theta$ from the measuring point of the measuring head A, the displacement outputs of the measuring heads A, B and C are described by the following equations:

$$S_A(\theta)=r(\theta)+y(\theta), \quad (1)$$

$$S_B(\theta)=r(\theta-\phi)+y(\theta)\cos\phi-x(\theta)\sin\phi\text{,tm (2)}$$

and $$S_c(\theta)=r(\theta-\tau)+y(\theta)\cos\tau-x(\theta)\sin\tau, \quad (3)$$

where $x(\theta)$ and $y(\theta)$ represent the X-component and the Y-component of the rotational error, respectively. By removing the terms of the rotational error from the equations (1), (2) and (3), the differential output $S(\theta)$ is described by the following equation:

$$S(\theta) = S_A(\theta) + aS_B(\theta) + bS_C(\theta) \quad (4)$$
$$= r(\theta) + ar(\theta - \phi) + br(\theta - \tau),$$

where
$a=-\sin\tau/\sin(\tau-\phi)$, and
$b=\sin\phi/\sin(\tau-\phi)$.

The equation (4) completely separates the components of the rotational error of the workpiece 10 and the components of the shape of the workpiece 10 to cancel the components of the rotational error of the workpiece 10. By calculating the differential output $S(\theta)$ by the equation (4), the shape of the workpiece 10 can be precisely determined.

As described above, the machine control gage system of this embodiment measures the size of the workpiece 10 at the three points with the measuring head 16 and the measuring head 40 and corrects the data in the three-point method. Accordingly, the shape of the workpiece 10 can be precisely determined and the roundness can be precisely determined.

Figure 11:
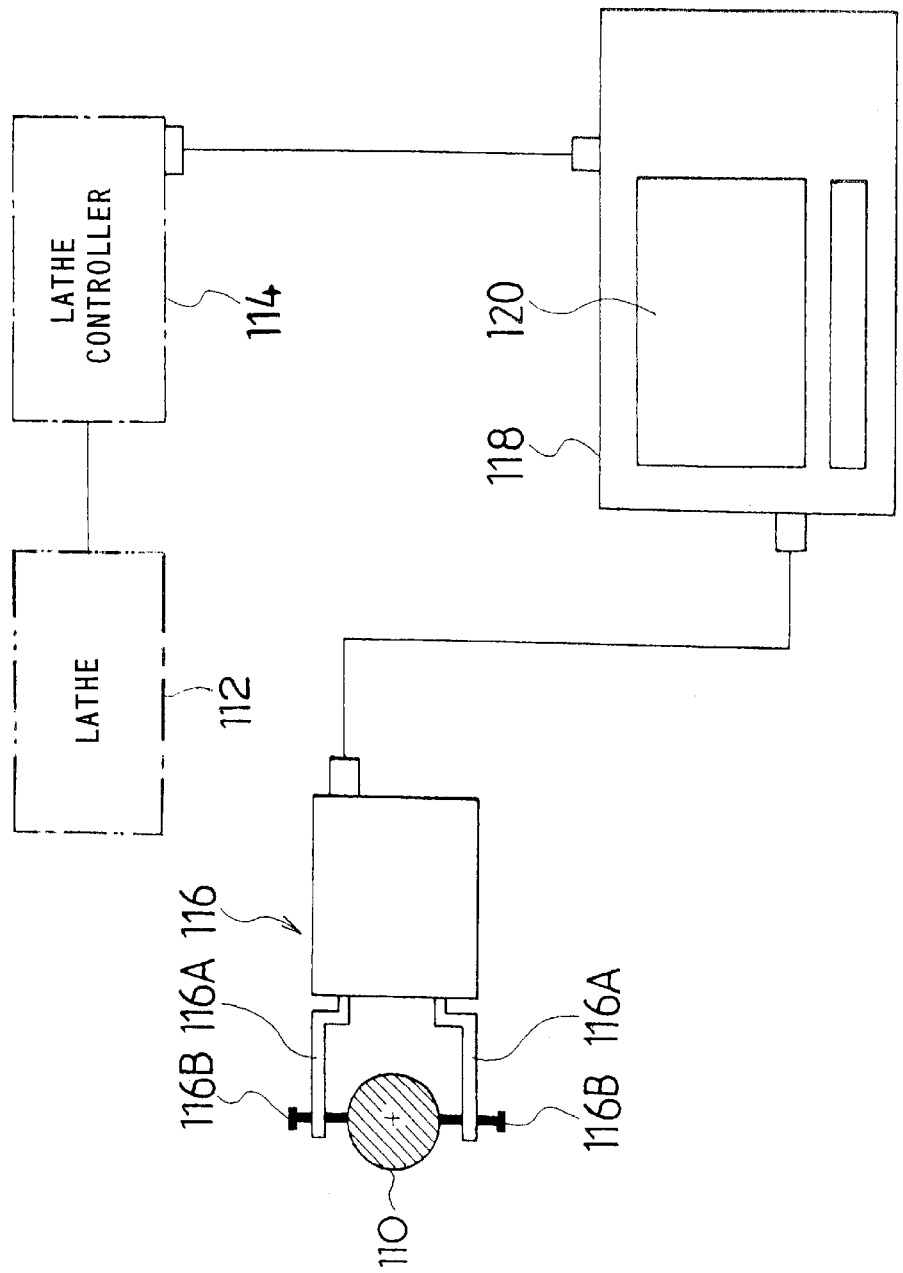
FIG. 11 is a view illustrating the entire structure of a machine control gage system according to a third embodiment of the present invention.

FIG. 11 shows the entire structure of a machine control gage system according to a third embodiment of the present invention, which is an automatic inspecting device applied to a lathe.

The lathe 112 cuts the inner or outer periphery of a workpiece 110 by pressing a tool against the rotating workpiece 110. In the lathe 112, the workpiece 110 is held by a chuck provided on a spindle (not shown), and the workpiece 110 rotates by driving a motor (not shown) connected to the spindle. The rotating speed of the workpiece 110 is controlled by a lathe controller 114, and the movement of the tool with respect to the workpiece 110 is controlled by the lathe controller 114.

Figure 12:
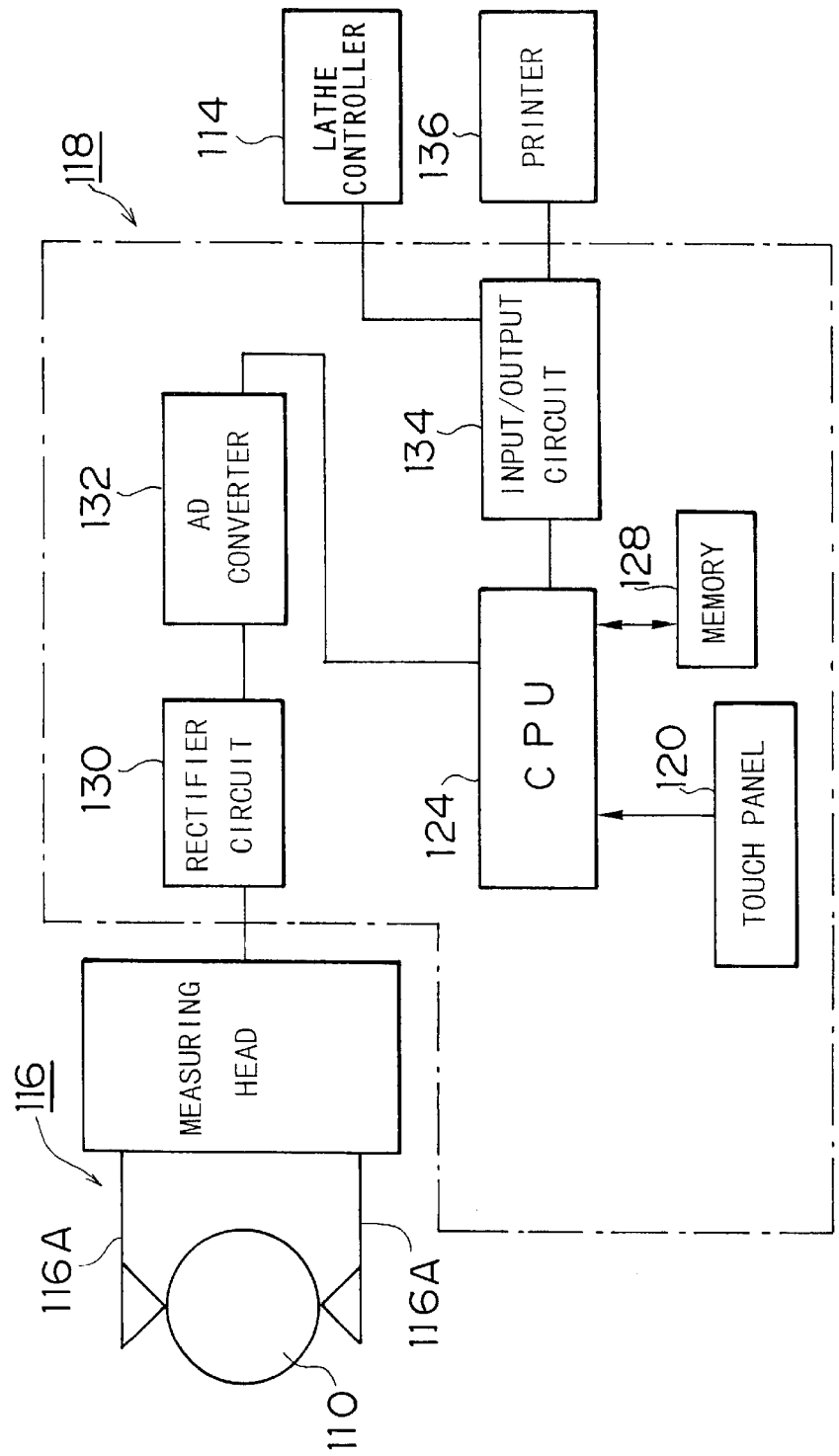
FIG. 12 is a block diagram showing the structure of the machine control gage system in FIG. 11.

The machine control gage system measures the size of the workpiece 110 after the machining by the lathe 112 to remove defective workpieces 110 and feeds-back the measured size to the lathe 112 to correct the machining conditions. As shown in FIGS. 11 and 12, the machine control gage system comprises a measuring head 116, which is applied to the workpiece 10, and a control unit 118, which analyzes the measurement data outputted from the measuring head 116.

The measuring head 116 has two fingers 116A, which are capable of swinging about fulcrums within the body of the measuring head 116, and contacts 116B are attached to the ends of the fingers 116A. The tips of the contacts 116B come into contact with the inner or outer peripheral surface of the workpiece 110. The measuring head 116 determines the displacement of the fingers 116A as an electric signal with a differential transformer within the body thereof and outputs the electric signal to the control unit 118.

The control unit 118 comprises a touch panel 120, a CPU 124, a memory 128, a rectifier circuit 130, an A/D converter 132 and an input/output circuit 134. The electric signal representing the displacement of the fingers 116A outputted from the measuring head 116 is rectified by the rectifier circuit 130 and then converted into a digital signal by the A/D converter 132. The CPU 124 calculates the size of the workpiece 110 according to the measurement data converted into the digital signal. The CPU 124 determines whether the workpiece 110 is defective or not by comparing the calculated size (measured size) of the workpiece 110 and the tolerance and removes the defective workpieces 110. At the same time, the CPU 124 outputs the measured size to the lathe controller 114 through the input/output circuit 134. The controller 114 corrects the position of the edge of the tool, the position of the workpiece 110, and so on in the lathe 112 according to the measured size.

Figure 13:
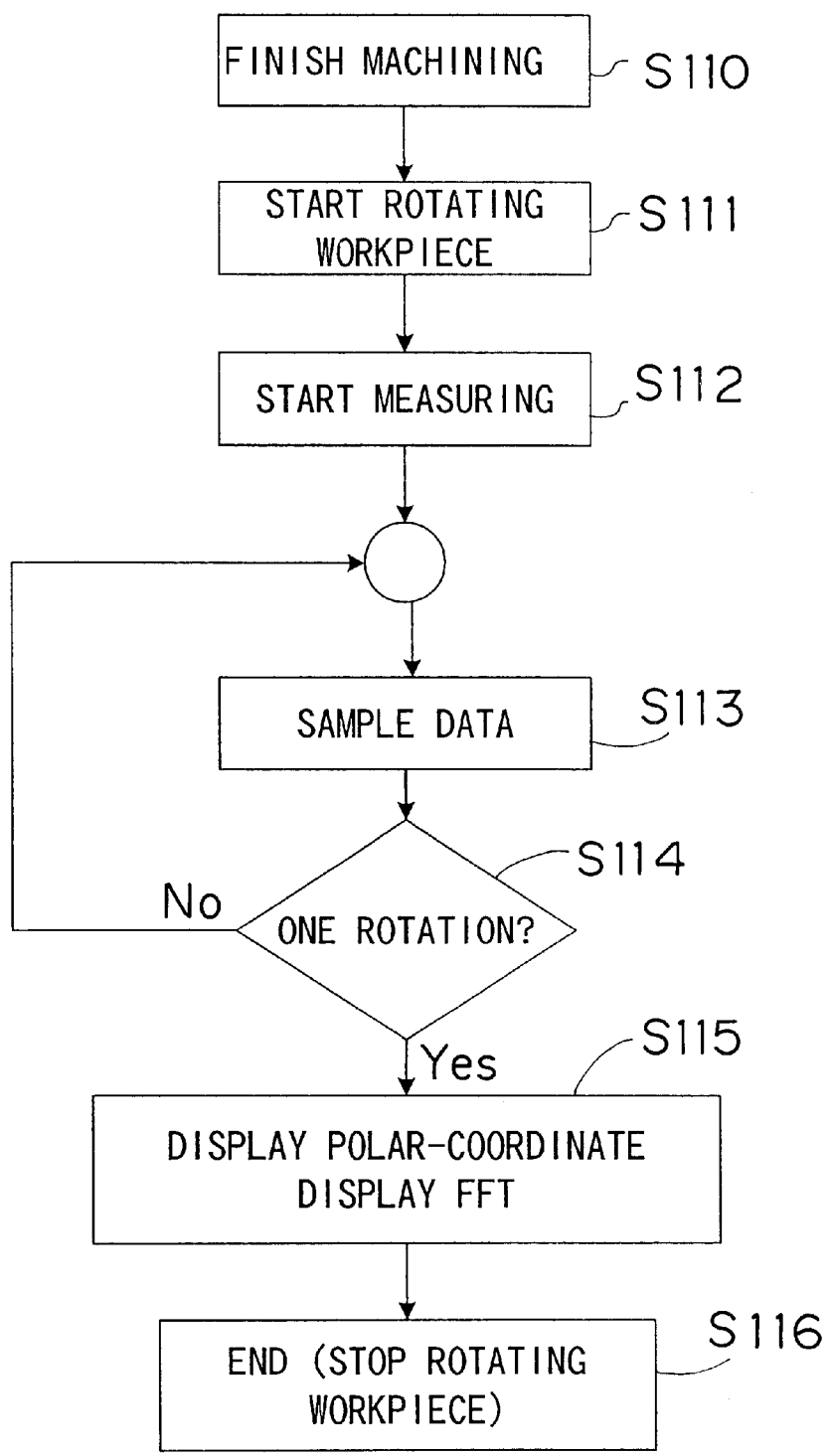
FIG. 13 is a flow chart showing the procedure for a control unit to calculate the roundness.

As described above, the machine control gage system according to this embodiment measures the size of the workpiece 110 machined by the lathe 112 to remove defective workpieces 110 and feeds-back the measured size to the lathe 112 to correct the machining conditions. The machine control gage system according to this embodiment also performs a roundness measuring function for measuring the roundness of the workpiece 110. The roundness is measured according to the flow chart in FIG. 13 as follows.

When the lathe 112 finishes machining the workpiece 110 (S110), the control unit 118 outputs a rotation start signal to the lathe controller 114. The lathe controller 114 rotates the workpiece 110 at a preset angular speed according to the rotation start signal (S111).

Then, the control unit 118 starts sampling the measurement data corresponding to the rotational angles of the workpiece 110 from the measuring head 116 (S112). The sampled data is stored in the memory 128 every predetermined time (S113).

The measurement data is sampled for one rotation of the workpiece 110 (S114), and then the control unit 118 executes a roundness analyzing processing on the basis of the measurement data.

Figure 14:
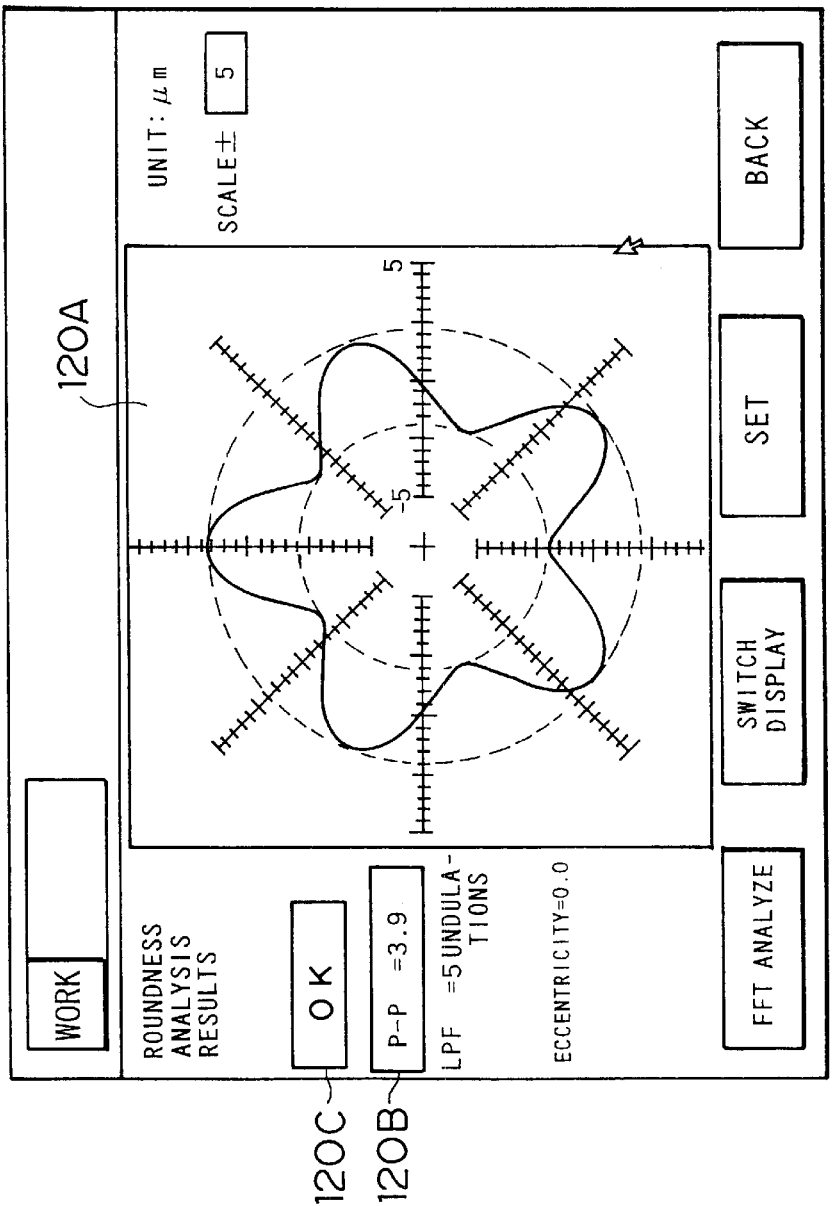
FIG. 14 is a view showing a picture of a touch panel whose polar-coordinate displaying part displays roundness.

The sampled measurement data for one rotation is filtered, and radiuses corresponding to the rotational angles of the workpiece 110 are calculated according to the filtered data. The calculated results are displayed on a polar-coordinate displaying part 120A of the touch panel 120 as shown in FIG. 14. At the same time, the difference between the maximum and the minimum of the radiuses is found as the roundness, and the calculated roundness is displayed on a P—P value displaying part 120B of the touch panel 120 (S115).

Then, the roundness measurement ends and the control unit 118 outputs a rotation stop signal to the lathe controller 114 to stop the rotation of the workpiece 110 (S116).

As described above, the machine control gage system of this embodiment performs not only the machine control gage function but also the roundness measuring function. Thus, there is no necessity to transfer the workpiece 110 to a roundness measuring machine in order to measure the roundness of the workpiece 110, and the roundness of all the workpieces 110 machined in the production line or the like can be measured.

As described above, the machine control gage system of this embodiment can measure the roundness of the workpiece 110 and determine whether the roundness of the workpiece 110 is good or bad according to the measurement data. The control unit 118 compares the roundness calculated by the above-described roundness analyzing processing with a maximum of the roundness set by the operator. If the calculated roundness is not more than the maximum, "OK" is displayed on a determining part 120C of the touch panel 120 as shown in FIG. 14. If the roundness is more than the maximum, "NG" is displayed on the determining part 120C.

As described above, the machine control gage system can determine whether the roundness of the workpiece 110 is good or bad. The determined result may be outputted to an external apparatus as need arises, and thus defective workpieces 110 can be removed from the production line.

The operator sets the maximum of the roundness with the touch panel 120 or the like. The operator may set that before the start of the machining of the workpiece 110, during or after the machining.

Figure 15:
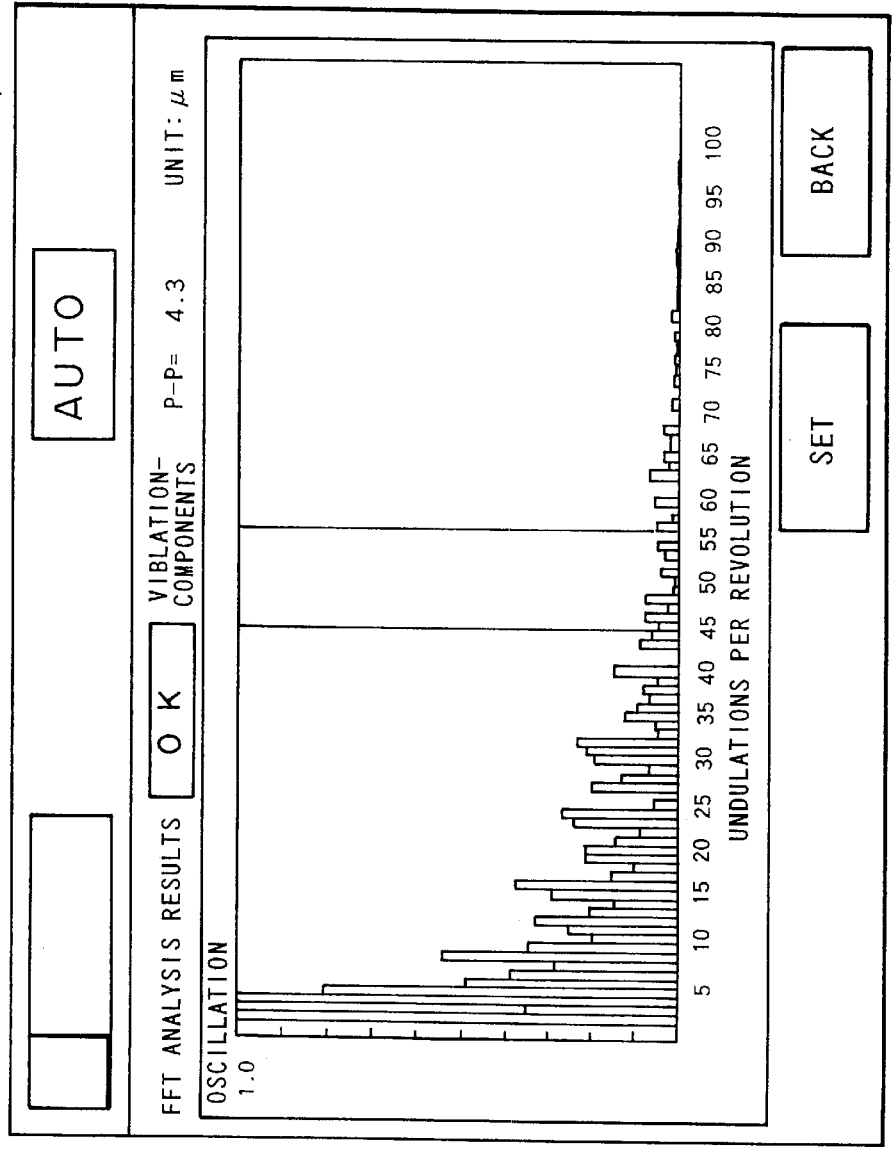
FIG. 15 is a view showing a picture of the touch panel displaying a power spectrum of the results of an FFT analysis.

The filtered radius data of the workpiece 110 is fast Fourier transformed and analyzed into frequency components (FFT analysis), and the power spectrum acquired by FFT analysis is displayed on the touch panel 120 as shown in FIG. 15. Accordingly, the cause of the defectiveness of the roundness can be found by analyzing the data into the components. Generally, oscillations of low-frequency components such as ellipses and triangles are so large that oscillations of 20 and 30 undulations per revolution, which are considered vibrations, are ineffective. However, by the FFT analysis, the oscillation of each component is specific and the components that are considered the vibrations can be analyzed.

Figures 16A, 16B:
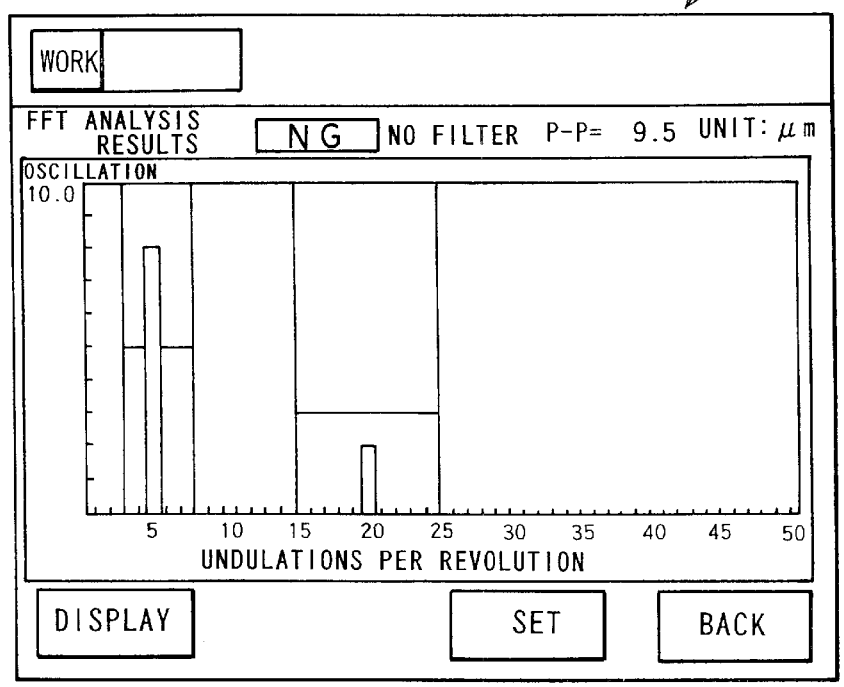
FIGS. 16(a) and 16(b) are views showing pictures of the touch panel displaying a determination results whether the roundness is good or bad according to the results of the FFT analysis.

The control unit 118 may compare the oscillations of specific frequencies acquired by the FFT analysis with the preset maximums of the oscillations of the frequencies to automatically determine whether the roundness of the workpiece 110 is good or bad and the machining conditions are good or bad. Then, as shown in FIGS. 16(*a*) and 16(*b*), if the oscillation of the specific frequency acquired by the FFT analysis is not more than the preset maximum of the oscillation of the frequency, "OK" is displayed on an FFT analysis determining part 120D of the touch panel 120. If the oscillation of the specific frequency acquired by the FFT analysis is more than the preset maximum of the oscillation of the frequency, "NG" is displayed on the FFT analysis determining part 120D.

In the example shown in FIGS. 16(*a*) and 16(*b*), the maximum of the oscillations of 3–8 undulations per revolution (frequency) is set at 5 $\mu$m, and the maximum of the oscillations of 15–25 undulations per revolution is set at 3 $\mu$m. The measured maximum of the oscillations of 3–8 undulations per revolution is 8.0 $\mu$m, and thus "NG" is displayed on the FFT analysis determining part 120D. The measured maximum of the oscillations of 15–25 undulations per revolution is 2.0 $\mu$m, and thus "OK" is displayed on the FFT analysis determining part 120D.

As described above, the machine control gage system can determine whether the roundness of the workpiece 110 is good or bad and the machining conditions are good or bad. The determined result may be outputted to an external apparatus as need arises, and thus defective workpieces 110 can be removed from the production line.

The operator sets the maximums of the oscillations with the touch panel 120 or the like. The operator may set them before the start of the machining of the workpiece 110, during or after the machining.

In this embodiment, a frequency analyzing device analyzes the radius data by means of FFT, but it may use other analyzing methods.

In this embodiment, the size and the roundness of the workpiece 110 are measured in a state where the workpiece 110 is held by the chuck provided on the spindle of the lathe 112 (i.e., in the lathe 112), but the size and the roundness of the workpiece 110 may be measured in a state where the workpiece 110 is held by a rotating-driving device other than the lathe 112 (i.e., outside the lathe 112). In this case, the workpiece 110 is detached from the chuck of the lathe 112 after the lathe 112 machines the workpiece 110, and the workpiece 110 is attached to the rotating-driving device other than the lathe 112. Then, the workpiece 110 is rotated about the axis of it, and the size and the roundness of the workpiece 110 are measured as described in this embodiment. In this case, when the workpiece 110, detached from the lathe 112, is attached to a chuck of the rotating-driving device, the center of the workpiece 110 can be displaced from the rotational center of the rotating-driving device. The eccentric deviation is corrected if the center of the workpiece 110 is off the rotational center of the rotating-driving device. After the sampled measurement data for one rotation is filtered, the control unit 118 finds the axis of the workpiece 110 from the measurement data to calculate the eccentricity, which is the deviation of the axis of the workpiece 110 with respect to the rotational center of the rotating-driving device, so as to correct the eccentric deviation of the measurement data. Then, the control unit 118 calculates the radiuses corresponding to the rotational angles of the workpiece 110 according to the corrected data. The calculated results are displayed on the polar-coordinate displaying part 120A of the touch panel 120.

In the above-described embodiment, by measuring the size and the roundness of the workpiece 110 inside the lathe 112, there is no necessity to transfer the machined workpiece 110 to the roundness measuring machine outside the lathe 112, and as a result the workpiece 110 can be efficiently machined. In addition, the axis of the workpiece 110 is not displaced, and thus the machined workpiece 110 can be precisely measured.

In this embodiment, the machine control gage system according to the present invention is applied to the lathe 112, but it may be applied to other machining device.

Figure 17:
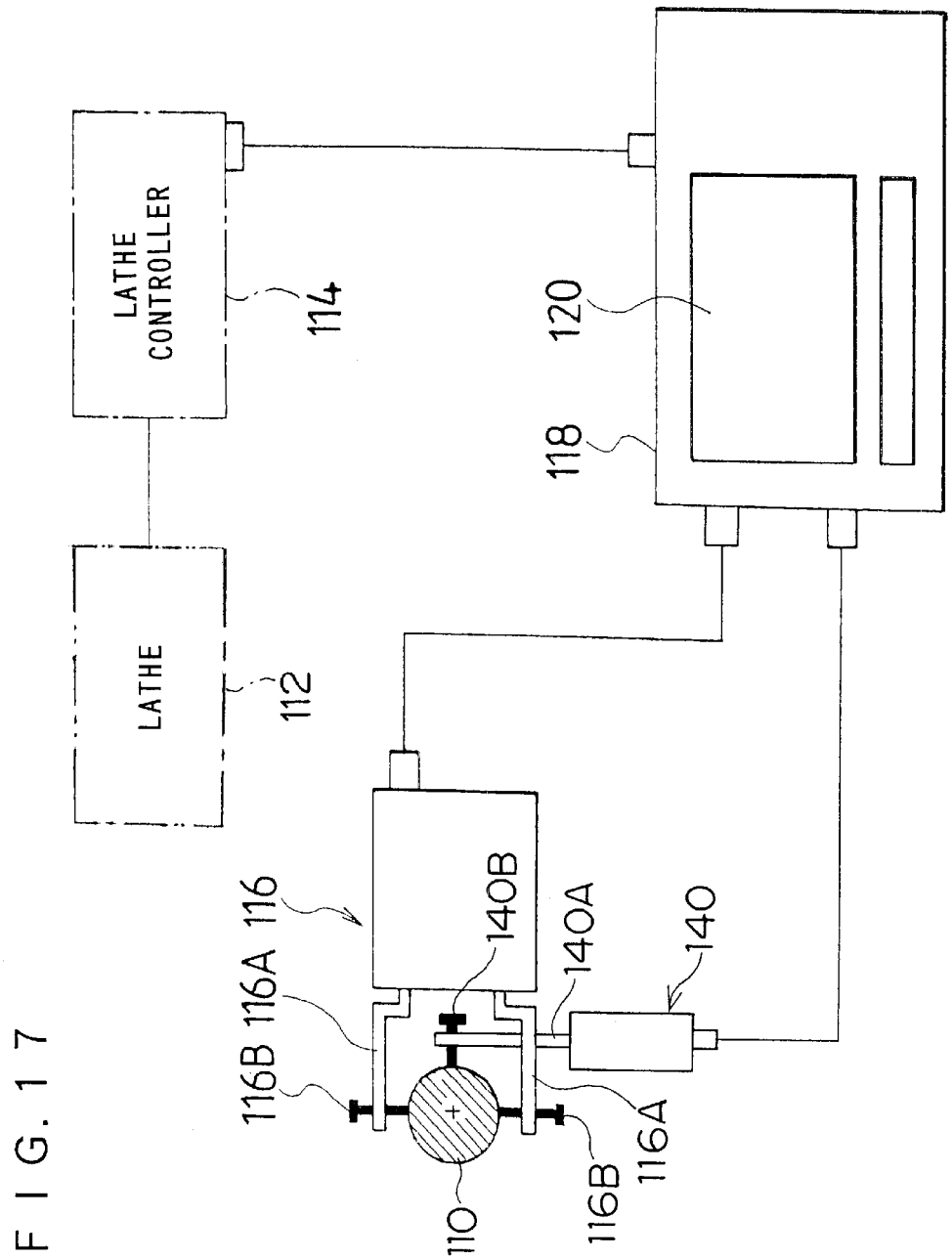
FIG. 17 is a view illustrating the entire structure of a machine control gage system according to a fourth embodiment of the present invention.

FIG. 17 shows the entire structure of a machine control gage system according to a fourth embodiment of the present invention, and members the same as or similar to members in the machine control gage system according to the third embodiment are denoted by the same numerals and they will not be explained.

The machine control gage system according to the fourth embodiment is different from the machine control gage system according to the third embodiment in that it has a measuring head 140. The measuring head 140 has a finger 140A, which is capable of swinging about a fulcrum within the body of the measuring head 140, and a contact 140B is attached to the end of the finger 140A. The tip of the contact 140B comes into contact with the outer peripheral surface of the workpiece 110. As the size of the workpiece 110 changes during the machining, the finger 140A swings according to the change of the size of the workpiece 110. The measuring head 140 determines the displacement of the finger 140A as an electric signal with a differential transformer within the body thereof and outputs the electric signal to the control unit 118.

Figure 18:
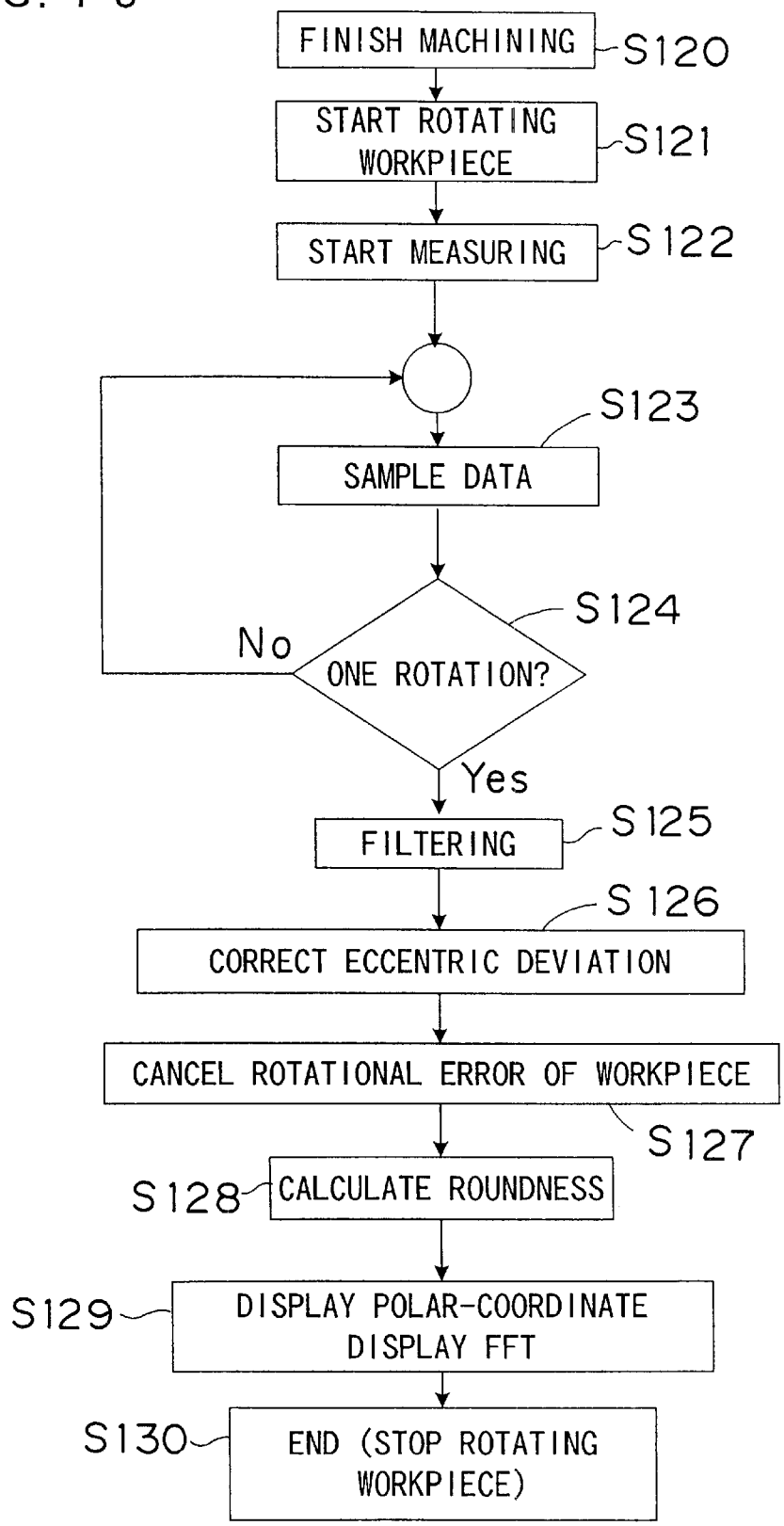
FIG. 18 is a flow chart showing the procedure for a control unit of the machine control gage system in FIG. 17.

As shown in FIG. 18, when the lathe 112 finishes machining the workpiece 110 (S120), the control unit 118 outputs the rotation start signal to the lathe controller 114. The lathe controller 114 rotates the workpiece 110 at a preset angular speed according to the rotation start signal (S121).

Then, the control unit 118 starts sampling the measurement data corresponding to the rotational angles of the workpiece 110 from the measuring head 116 and the measuring head 140 (S122). The sampled data is stored in the memory 128 every predetermined time (S123).

The measurement data is sampled for one rotation of the workpiece 110 (S124), and then the control unit 118 executes a roundness analyzing processing on the basis of the measurement data.

The sampled measurement data for one rotation is filtered (S125). In the filtering, for example, the user sets a cutoff values or cutoff values and noise components of short waves, bands other than the band required for the analysis, and so on are cut off. After the filtering, the control unit 118 finds the axis of the workpiece 110 according to the measurement data measured with the measuring head 116 and corrects the eccentric deviation of the measurement data (S126).

Then, the rotational error of the workpiece 110 is canceled in the three-point method according to samples of the measurement data measured with the measuring head 116 and the measuring head 140 (S127). The rotational error of the workpiece 110 is canceled in the three-point method, and thus the shape of the workpiece 110 can be precisely determined.

The control unit 118 finds radiuses of an inscribed circle and a circumscribed circle that are concentric with the workpiece 110 and calculates the roundness, which is the difference in radius between the inscribed circle and the circumscribed circle (S128). The calculated radiuses corresponding to the rotational angles are displayed on the polar-coordinate displaying part 120A of the touch panel 120. At the same time, the calculated roundness is displayed on the P—P value displaying part 120B of the touch panel 120 (S129).

Then, the roundness measurement ends and the control unit 118 outputs the rotation stop signal to the lathe controller 114 to stop the rotation of the workpiece 110 (S130).

As described above, the machine control gage system of this embodiment measures the size of the workpiece 110 at the three points with the measuring head 116 and the measuring head 140 and corrects the data in the three-point method. Accordingly, the shape of the workpiece 110 can be precisely determined and the roundness can be precisely determined.

As set forth hereinabove, the machine control gage system, used in the process line, performs a roundness measuring function of measuring roundness of the workpiece. Therefore, the roundness can be measured in the process line without detaching the workpiece from the machining device.

As set forth hereinabove, the machine control gage system, that measures the size of the workpiece machined with the machining device, performs a roundness measuring function of measuring the roundness of the workpiece. Accordingly, there is no necessity to measure the roundness of the workpiece with the special roundness measuring device. Therefore, the roundness of all the workpieces machined in the production line or the like can be measured.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A machine control gage system which measures a size of a workpiece while a machining device machines the workpiece and commands the machining device to stop machining when the measured size of the workpiece reaches a preset size, the machine control gage system comprising:

a radius data measuring device which measures radius data corresponding to rotational angles of the workpiece;

a storing device which stores the radius data measured by the radius data measuring device; and a roundness calculating device which analyzes roundness of the workpiece in accordance with the radius data stored in the storing device to calculate the roundness of the workpiece, wherein the machine control gage system performs a roundness measuring function, and the roundness calculating device analyzes the roundness of the workpiece to calculate the roundness of the workpiece in accordance with the radius data that is stored in the storing device just before the machining device finishes machining the workpiece.

2. The machine control gage system as defined in claim 1, further comprising a correcting device which calculates eccentricity of an axis of the workpiece with respect to a rotational center of the machining device in accordance with the radius data stored in the storing device and corrects the eccentricity.

3. The machine control gage system as defined in claim 1, further comprising a determining device which compares the roundness calculated by the roundness calculating device with a preset maximum and determines that the workpiece is defective when the roundness is more than the preset maximum.

4. The machine control gage system as defined in claim 1, wherein the roundness calculating device comprises a filtering device which extracts a predetermined frequency band from the radius data stored in the storing device.

5. The machine control gage system as defined in claim 1, wherein the roundness calculating device comprises a frequency-analyzing device which frequency-analyzes the radius data stored in the storing device.

6. The machine control gage system as defined in claim 5, wherein the frequency-analyzing device fast Fourier transforms the radius data stored in the storing device.

7. The machine control gage system as defined in claim 1, wherein the radius data measuring device measures the size of the workpiece at at least three points, and comprises a cancellation-calculating device which cancellation-calculates a rotational error of the workpiece in accordance with measured values measured by the radius data measuring device at the at least three points.

8. A machine control gage system which measures a size of a workpiece rotated by a rotating-driving device after a machining device machines the workpiece, performs a roundness measuring function, and performs one of determination whether the workpiece is defective or not in accordance with measurement data and feed-back of the measurement data to the machining device, the machine control gage system comprising:

at least three radius data measuring devices which measure radius data corresponding to rotational angles of the workpiece by measuring the size of the workpiece at at least three points, axes of the at least three radius data measuring devices intersecting with each other at a single point;

a cancellation-calculating device which calculates and cancels a rotational error of the workpiece in accordance with measured values measured by the at least three radius data measuring devices at the at least three points;

a storing device which stores the radius data measured by the at least three radius data measuring devices; and a roundness calculating device which analyzes roundness of the workpiece in accordance with the radius data stored in the storing device to calculate the roundness of the workpiece.

9. The machine control gage system as defined in claim 8, further comprising a correcting device which calculates eccentricity of an axis of the workpiece with respect to a rotational center of the rotating-driving device in accordance with the radius data stored in the storing device and corrects the eccentricity.

10. The machine control gage system as defined in claim 8, wherein the roundness calculating device comprises a filtering device which extracts a predetermined frequency band from the radius data stored in the storing device.

11. A machine control gage system which measures a size of a workpiece rotated by a rotating-driving device after a machining device machines the workpiece and performs one of determination whether the workpiece is defective or not in accordance with measurement data and feed-back of the measurement data to the machining device, the machine control gage system comprising:

a radius data measuring device which measures radius data corresponding to rotational angles of the workpiece;

a storing device which stores the radius data measured by the radius data measuring device; and a roundness calculating device which analyzes roundness of the workpiece in accordance with the radius data stored in the storing device to calculate the roundness of the workpiece, wherein the machine control gage system performs a roundness measuring function, and the radius data measuring device measures the size of the workpiece at at least three points, and comprises a cancellation-calculating device which cancellation-calculates a rotational error of the workpiece in accordance with measured values measured by the radius data measuring device at the at least three points;

further comprising a determining device which compares the roundness calculated by the roundness calculating device with a preset maximum and determines that the workpiece is defective when the roundness is more than the preset maximum.

12. A machine control gage system which measures a size of a workpiece rotated by a rotating-driving device after a machining device machines the workpiece and performs one of determination whether the workpiece is defective or not in accordance with measurement data and feed-back of the measurement data to the machining device, the machine control gage system comprising:

a radius data measuring device which measures radius data corresponding to rotational angles of the workpiece;

a storing device which stores the radius data measured by the radius data measuring device; and a roundness calculating device which analyzes roundness of the workpiece in accordance with the radius data stored in the storing device to calculate the roundness of the workpiece, wherein the machine control gage system performs a roundness measuring function, the radius data measuring device measures the size of the workpiece at at least three points, and comprises a cancellation-calculating device which cancellation-calculates a rotational error of the workpiece in accordance with measured values measured by the radius data measuring device at the at least three points; and the roundness calculating device comprises a frequency-analyzing device which frequency-analyzes the radius data stored in the storing device.

13. The machine control gage system as defined in claim 12, wherein the frequency-analyzing device fast Fourier transforms the radius data stored in the storing device.

14. A machine control gage system which measures a size of a workpiece while a machining device machines the workpiece, performs a roundness measuring function, and commands the machining device to stop machining when the measured size of the workpiece reaches a preset size, the machine control gage system comprising:

at least three radius data measuring devices which measure radius data corresponding to rotational angles of the workpiece by measuring the size of the workpiece at at least three points, axes of the at least three radius data measuring devices intersecting with each other at a single point;

a cancellation-calculating devices which calculates and cancels a rotational error of the workpiece in accordance with measured values measured by the at least three radius data measuring devices at the at least three points;

a storing device which stores the radius data measured by the at least three radius data measuring devices; and a roundness calculating device which analyzes roundness of the workpiece in accordance with the radius data stored in the storing device to calculate the roundness of the workpiece.

15. The machine control gage system as defined in claim 14, wherein the roundness calculating device analyzes the roundness of the workpiece to calculate the roundness of the workpiece in accordance with the radius data that is stored in the storing device just after the machining device finishes machining the workpiece.

16. The machine control gage system as defined in claim 14, further comprising a correcting device which calculates eccentricity of an axis of the workpiece with respect to a rotational center of the machining device in accordance with the radius data stored in the storing device and corrects the eccentricity.

17. The machine control gage system as defined in claim 14, wherein the roundness calculating device comprises a filtering device which extracts a predetermined frequency band from the radius data stored in the storing device.

18. A machine control gage system which measures a size of a workpiece while a machining device machines the workpiece and commands the machining device to stop machining when the measured size of the workpiece reaches a preset size, the machine control gage system comprising:

a radius data measuring device which measures radius data corresponding to rotational angles of the workpiece;

a storing device which stores the radius data measured by the radius data measuring device; and a roundness calculating device which analyzes roundness of the workpiece in accordance with the radius data stored in the storing device to calculate the roundness of the workpiece, wherein the machine control gage system performs a roundness measuring function and wherein the radius data measuring device measures the size of the workpiece at at least three points, and comprises a cancellation-calculating device which cancellation-calculates a rotational error of the workpiece in accordance with measured values measured by the radius data measuring device at the at least three points;

further comprising a determining device which compares the roundness calculated by the roundness calculating device with a preset maximum and determines that the workpiece is defective when the roundness is more than the preset maximum.

19. A machine control gage system which measures a size of a workpiece while a machining device machines the workpiece and commands the machining device to stop machining when the measured size of the workpiece reaches a preset size, the machine control gage system comprising:

a radius data measuring device which measures radius data corresponding to rotational angles of the workpiece;

a storing device which stores the radius data measured by the radius data measuring device; and a roundness calculating device which analyzes roundness of the workpiece in accordance with the radius data stored in the storing device to calculate the roundness of the workpiece, wherein the machine control gage system performs a roundness measuring function, wherein the radius data measuring device measures the size of the workpiece at at least three points, and comprises a cancellation-calculating device which cancellation-calculates a rotational error of the workpiece in accordance with measured values measured by the radius data measuring device at the at least three points; and wherein the roundness calculating device comprises a frequency-analyzing device which frequency-analyzes the radius data stored in the storing device.

20. The machine control gage system as defined in claim 19, wherein the frequency-analyzing device fast Fourier transforms the radius data stored in the storing device.

* * * * *